(12) United States Patent
Klein

(10) Patent No.: US 9,180,758 B2
(45) Date of Patent: Nov. 10, 2015

(54) FILM FOR SEPARATING A WET AREA FROM A DRY AREA OF A DOOR BOX OF A VEHICLE DOOR

(71) Applicant: GM GLOBAL TECHNOLOGY OPERATIONS LLC, Detroit, MI (US)

(72) Inventor: Wolfgang Klein, St. Goar-Werlau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 102 days.

(21) Appl. No.: 14/026,911

(22) Filed: Sep. 13, 2013

(65) Prior Publication Data

US 2014/0084622 A1  Mar. 27, 2014

(30) Foreign Application Priority Data

Sep. 14, 2012  (DE) .......................... 10 2012 018 293

(51) Int. Cl.
*B60J 5/04* (2006.01)
(52) U.S. Cl.
CPC ..................................... *B60J 5/0418* (2013.01)
(58) Field of Classification Search
CPC ............................ B60R 13/0243; B60J 5/0418

USPC .................... 296/146.1, 146.5, 146.7; 49/502
See application file for complete search history.

(56) References Cited

U.S. PATENT DOCUMENTS

| 6,302,472 B1 | 10/2001 | Rahmstorf et al. |
| 2006/0043764 A1* | 3/2006 | Schroder et al. ........... 296/146.7 |
| 2008/0238136 A1* | 10/2008 | Fuetterer .................... 296/146.6 |

FOREIGN PATENT DOCUMENTS

| DE | 7735168 U1 | 2/1978 |
| DE | 102007001039 A1 | 9/2007 |
| EP | 1053119 B1 | 6/2004 |

OTHER PUBLICATIONS

German Patent Office, German Patent Search Report for Application No. 102012018293.7, dated Aug. 26, 2013.

* cited by examiner

*Primary Examiner* — Joseph D Pape
(74) *Attorney, Agent, or Firm* — Ingrassia Fisher & Lorenz PC

(57) ABSTRACT

A film is provided for separating a wet area from a dry area of a door box of a vehicle door in a motor vehicle. The film for passing-through an actuator includes, but is not limited to an opening, which is formed in a pocket-like stamping.

14 Claims, 2 Drawing Sheets

FILM FOR SEPARATING A WET AREA FROM A DRY AREA OF A DOOR BOX OF A VEHICLE DOOR

CROSS-REFERENCE TO RELATED APPLICATION

This application claims priority to German Patent Application No. 10 2012 018 293.7, filed Sep. 14, 2012, which is incorporated herein by reference in its entirety.

TECHNICAL FIELD

The technical field relates to a film for separating a wet area from a dry area of a door box of a vehicle door.

BACKGROUND

From the general prior art, vehicle doors for motor vehicles are known. In general, a wet area located outside and a dry area located in the direction of an interior trim are distinguished in vehicle doors. The wet area is an area that is not completely protected from entering water or dust. Water or dust can for example enter with opened or partially opened window. In order to prevent water accumulation, the door is usually provided with drain openings on the bottom side. Since in vehicle doors a door lock is usually located on the outside, a control cable has to be provided for opening the door from the vehicle interior, which connects a handle with the door lock for unlocking. The dry area is often separated from the wet area with a film, which is intended to prevent water or dust entering. From DE 10 2007 001 039 A1 a sealing film for a vehicle door is known, which has a slit-like opening through which a control cable is routed.

At least one object is to reduce possible entering of dust or water in the door area. In addition, other objects, desirable features and characteristics will become apparent from the subsequent summary and detailed description, and the appended claims, taken in conjunction with the accompanying drawings and this background.

SUMMARY

Accordingly, a film is created for separating a wet area from a dry area of a door box of a vehicle door in a motor vehicle. For passing through an actuator the film has an opening which is formed in a pocket-like stamping. Accordingly, an improvement compared with the openings in door films that are usually formed slit-like is achieved since the pocket-like stamping closes in around the actuator thus creating a tolerance compensation. Consequently, dimensioning of the opening is no longer guided by tolerance specifications, as happens in the case of openings of slit-like design according to the prior art. In addition, the pocket-like stamping reduces a tearing-out of the opening which brings with it additional advantages.

In an embodiment, the opening is formed on the most elevated position of the pocket-like stamping as a cross-like, round, oval, star-shaped incision or perforation. According to this embodiment, the opening is produced as seal for passing through the actuator. Accordingly, an improvement with respect to repelling water and dust compared with the openings in door films that are usually embodied slit-like is achieved, since the opening closes in around the actuator, thus bringing about additional sealing.

In a further embodiment, the actuator comprises a control cable, a cable or a cable harness. Accordingly, the embodiments can be employed with all known actuators and can be integrated in a vehicle door in a simple manner.

In a further embodiment, the pocket-like stamping forms a raised structural element, which is oriented in the direction of the interior trim. The pocket-like stamping in this example is arranged in the direction of the inside, wherein the pocket-like stamping has a usually conical outer wall with the opening on the tip of the cone. In a further embodiment, the pocket-like stamping can be produced with a stamping method. Accordingly, the pocket-like stamping can be favorably produced and can be employed in films for sealing in a simple manner. In a further embodiment, the film can be produced from plastic. Plastic films allow a simple production of the pocket-like stamping for example by means of a stamping method.

In a further embodiment, the opening of the pocket-like stamping is adapted to a cross section of the actuator. It is consequently possible to configure the opening so that no or only as small as possible a gap develops around the actuator, which leads to improved sealing.

In addition, a vehicle door for a motor vehicle is stated, in which between an interior trim and a door box a film as described above is arranged. In addition to this, a tailgate for a motor vehicle is stated, in which between an interior trim and a body element a film as described above is arranged.

Finally, a motor vehicle is stated vehicle that is equipped with an abovementioned film, which brings about a sealing of a vehicle door, a tailgate, a retractable side window outside a vehicle door or of a body element. Transitions from the wet area into the dry area do not only occur in vehicle doors. The embodiments can thus also be employed with retractable windows, which for example are arranged on the body located behind the vehicle door, in convertible tops or similar.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
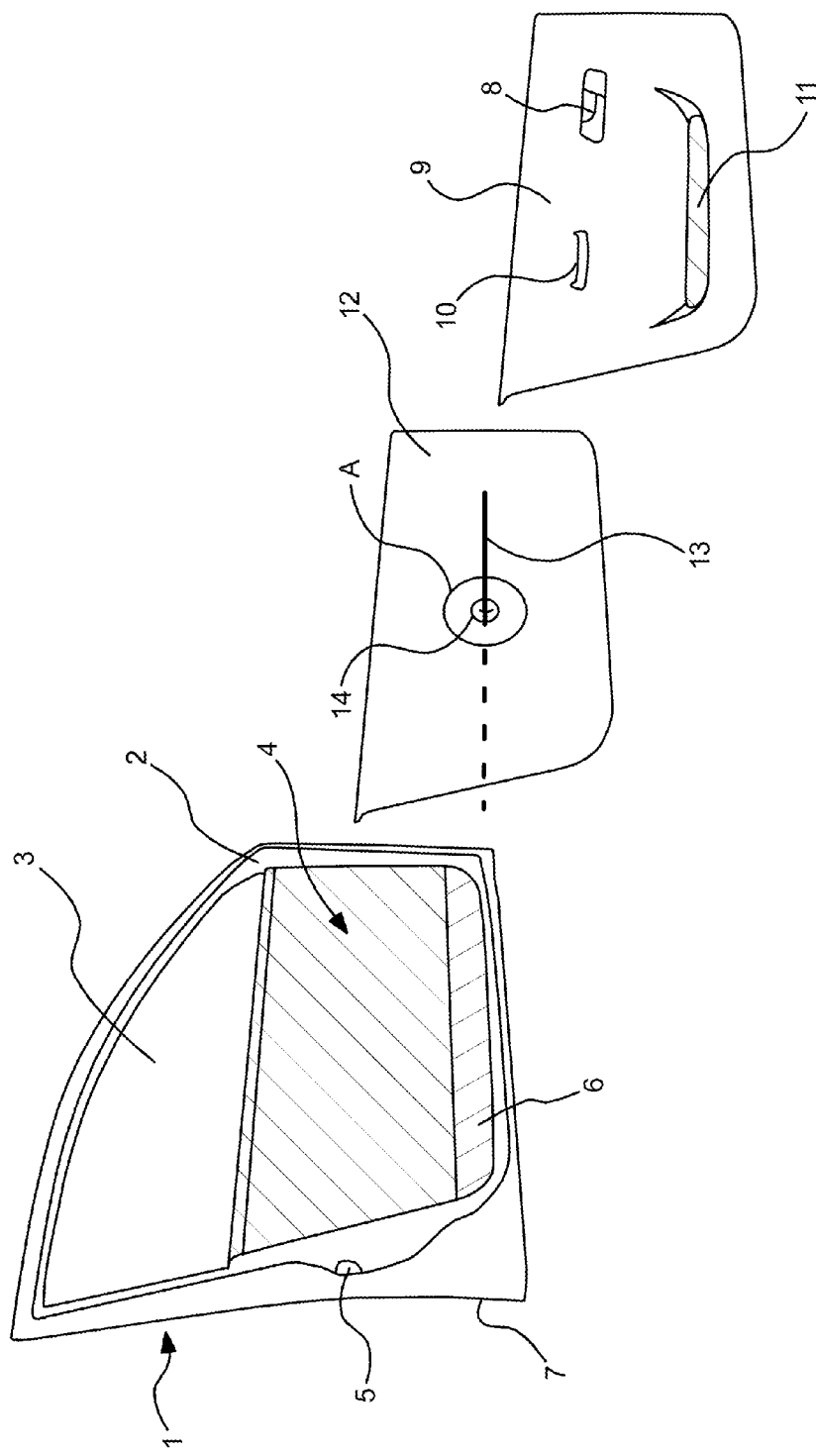
FIG. 1 is a vehicle door of a motor vehicle in an exploded representation according to an embodiment.

FIG. 1 shows a vehicle door 1 of a motor vehicle in an exploded representation. The vehicle door 1 comprises a body element 2, which is formed for example through compression molding and welding so that a window opening 3 and a door box 4 is formed. The door box 4 usually serves to house various assemblies, such as for example a pane for covering the window opening 3, electric window lifters for the pane and the like. In addition, a door lock 5 is arranged at a suitable location on the vehicle door 1, which serves for closing the vehicle door 1.

The door lock 5 is usually closed or opened through an unlocking lever attached on the inside 6, through a handle including locking cylinder arranged on the outside 7 or through a radio remote control. On the inside 6 of the vehicle door 1 the unlocking lever 8 is attached for this purpose, which is arranged on an interior trim 9. The interior trim 9 has a shape which makes possible a covering of the door box 4. In addition, the interior trim 9 is provided with a door handle and a utility compartment 11, which are exemplarily mentioned as further possible assemblies.

Between the interior trim 9 and the vehicle door 1 a film 12 is arranged in the door box 4, which serves as separating barrier between a wet area facing the outside 7 and a dry area facing the interior trim 9. The film 12 for this purpose is formed as a water-impermeable plastic film. In order to make possible interaction between the unlocking lever 8 and the door lock 5, an actuator 13 is provided, which as a control cable connects the unlocking lever 8 and the door lock 5. In the following, the actuator 13 is described as a control cable 13.

For this purpose, the control cable 13 has to be routed through the film 12, for the purpose of which an opening 14 is provided in the film 12 in the area A, as shown in FIG. 1, through which the control cable 13 is routed. Here, the opening 14 is merely intended to be understood as an example. Thus it is likewise conceivable to provide further openings for example for cables, cable harnesses or similar.

Figure 2:
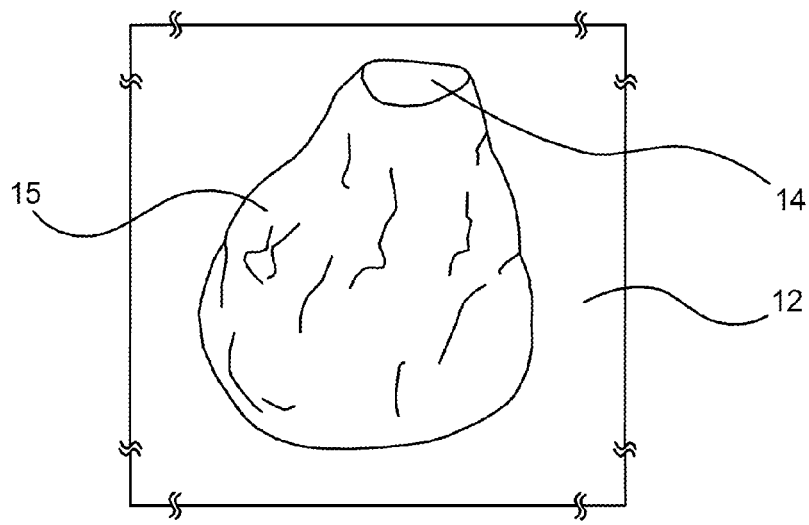
FIG. 2 is a film according to an embodiment in a top view.

At the place where the control cable 13 or the cable is passed through, the film 12 in the form of the opening 14 has a pocket-like stamping 15, as shown in FIG. 2. The pocket-like stamping 15 in this case is arranged on the surface facing the inside 6 and has an opening 14 in the film 12, which for example is arranged on the most elevated position of the pocket-like stamping 15.

Figure 3:
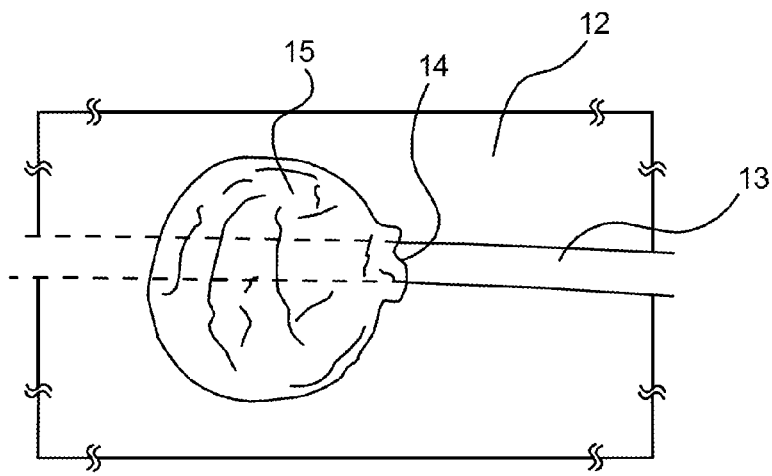
FIG. 3 is the film according to FIG. 2 in a further top view.

The area (A) shown in FIG. 1 is shown again in more detail in FIG. 3. It is noticeable that the control cable 13 passes through the opening 14 from the wet into the dry area under the pocket-like stamping 15. The pocket-like stamping 15 makes possible an improved tolerance compensation in the passing-through of the control cable 13, as a result of which the fitting accuracy and the lifespan of the film 12 are improved.

The pocket-like stamping 15 is shown as a conical structure in FIG. 3. However, it is also conceivable to employ other forms. Thus, the pocket-like stamping 15 can also be produced through hot stamping in many different forms, such as for example round, triangular, oval or similar.

Figure 4:
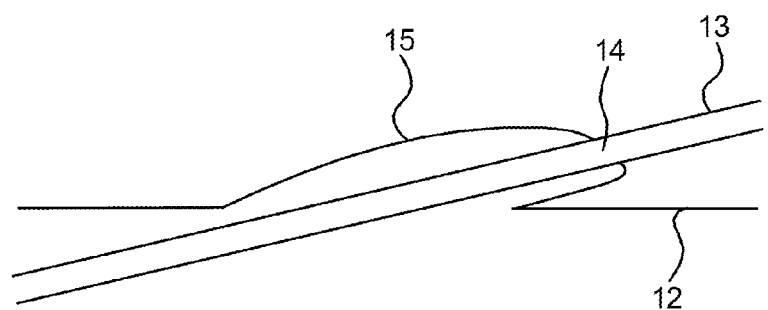
FIG. 4 is the film according to FIG. 2 in a cross-sectional view.

The improved sealing between wet and dry area is shown once more with reference to FIG. 4. The pocket-like stamping 15 forms a seal at the passing-through of the control cable 13, which is achieved through the opening 14, which is formed as a cross-like, round, oval, star-shaped incision or perforation. The pocket-like stamping 15 with the opening 14 makes possible an improved sealing between wet and dry area, which is accompanied by low dust ingress in a vehicle interior and reduced air flows.

The application of the film 12 in general is not restricted to vehicle doors. The film can also be employed for sealing a tailgate, a retractable side window outside a vehicle door or of a body element.

Although in the preceding description some possible embodiments of the invention were disclosed, it is to be understood that numerous further variants of embodiments exist through combination possibilities of all features mentioned and additionally all features and embodiments which are obvious to the person skilled in the art. It is to be understood, furthermore, that the exemplary embodiments are to be understood merely as examples which do not restrict the scope of protection, the applicability and the configuration in any way. The preceding description rather serves to show the person skilled in the art a suitable way in order to realize at least one exemplary embodiment. It is to be understood that with an exemplary embodiment, numerous changes with respect to function and arrangement of the elements can be carried out without leaving the scope disclosed in the claims and its equivalent.

What is claimed is:

1. A film for separating a wet area from a dry area of a door box of a vehicle door in a motor vehicle, the film comprising:
    a pocket formed in the film having an opening, wherein an actuator passes through the film within the opening of the pocket and the opening is formed at a most elevated position of the pocket.

2. The film according to claim 1, wherein the actuator comprises a control cable.

3. The film according to claim 1, wherein the pocket forms a raised structural element in the film that is oriented in a direction of an interior trim.

4. The film according to claim 1, wherein the pocket is stamped into the film.

5. The film according to claim 1, wherein the pocket is at least partially plastic.

6. The film according to claim 1, wherein a shape of the opening of the pocket corresponds to a cross section of the actuator.

7. A vehicle door for a motor vehicle,
    an interior trim;
    a door box; and
    a film between the interior trim and the door box, the film configured to separate a wet area from a dry area of the door box of the vehicle door in the motor vehicle, the film comprising
        a pocket formed in the film having an opening, wherein an actuator passes through the film within the opening of the pocket and the opening is formed at a most elevated position of the pocket.

8. The vehicle door according to claim 7, wherein the actuator comprises a control cable.

9. The vehicle door according to claim 7, wherein the pocket forms a raised structural element in the film that is oriented in a direction of an interior trim.

10. The vehicle door according to claim 7, wherein the pocket is at least partially plastic.

11. The vehicle door according to claim 7, wherein a shape of the opening of the pocket corresponds to a shape of a cross section of the actuator.

12. The film according to claim 1, wherein a shape of the opening is round.

13. The vehicle door according to claim 7, wherein the actuator comprises a control cable.

14. The vehicle door according to claim 7, wherein the actuator comprises a cable.

* * * * *